US007908167B1

(12) United States Patent
Crum et al.

(10) Patent No.: US 7,908,167 B1
(45) Date of Patent: Mar. 15, 2011

(54) SYSTEM AND METHOD FOR ANALYSIS OF PROJECT VARIANCES

(75) Inventors: James L. Crum, Lenexa, KS (US); Michael W. Kanemoto, Lawrence, KS (US)

(73) Assignee: Sprint Communications Company L.P., Overland Park, KS (US)

(*) Notice: Subject to any disclaimer, the term of this patent is extended or adjusted under 35 U.S.C. 154(b) by 1158 days.

(21) Appl. No.: 11/493,888

(22) Filed: Jul. 26, 2006

(51) Int. Cl.
*G06F 11/34* (2006.01)

(52) U.S. Cl. ............................................ 705/11; 705/8

(58) Field of Classification Search ...................... 705/11
See application file for complete search history.

(56) References Cited

U.S. PATENT DOCUMENTS

| | | | | |
|---|---|---|---|---|
| 5,907,490 A * | 5/1999 | Oliver | ............................... | 700/90 |
| 6,023,702 A * | 2/2000 | Leisten et al. | ......................... | 1/1 |
| 7,222,330 B2 * | 5/2007 | Bicknell et al. | ............... | 717/101 |
| 2002/0082889 A1 * | 6/2002 | Oliver | ............................... | 705/8 |
| 2003/0229618 A1 * | 12/2003 | Judy | ................................. | 707/1 |
| 2006/0229921 A1 * | 10/2006 | Colbeck | ............................ | 705/7 |

OTHER PUBLICATIONS

Development of a hierarchical, model-based design decision-support tool for assessing uncertainty of cost estimates by Ormon, Stephen Wayne, M.S., Mississippi State University, 2002, 94 pages; AAT 1418240.*
Wavelet based multiscale statistical process monitoring a literature review; Apr. 2004; ISSN: 0740-817X; Ganesan, Rajesh; Das, Tapas K.; Venkataraman, Vivekanand.*
Crum, James L., et al., U.S. Appl. No. 11/195,964, filed Aug. 3, 2005, entitled, "Spreading Algorithm for Work and Time Forecasting".
Chapman, C., et al., "Constructively Simple Estimating: A Project Management Example," Oct. 2003, The Journal of the Operational Research Society, vol. 54, No. 10, pp. 1050-1058.
The Free Dictionary, Definition of Rate Equation, Reaction Rate, http://encyclopedia2.the freedictionary.com/ Rate+equation+(chemistry), 3 pages.
Office Action dated May 7, 2009, U.S. Appl. No. 11/195,964, filed Aug. 3, 2005, 14 pgs.
Office Action dated Oct. 30, 2009, U.S. Appl. No. 11/195,964, filed Aug. 3, 2005, 17 pgs.
Final Office Action dated May 11, 2010, U.S. Appl. No. 11/195,964, filed Aug. 3, 2005, 39 pgs.
Advisory Action dated Jul. 22, 2010, U.S. Appl. No. 11/195,964, filed Aug. 3, 2005, 3 pgs.

* cited by examiner

*Primary Examiner* — Lynda C Jasmin
*Assistant Examiner* — Luis Santiago (57) ABSTRACT

Disclosed herein is a variance tracking report that provides a new and useful view of an enterprise's financial status. The variance tracking report may indicate variances from a planned work schedule and be used to explain any variances between projected and actual earnings as well as variances in project milestone dates. Further, the variance tracking report may show how current and past changes to the enterprise will impact future projections so the enterprise can give a clear indication of how any variances are being corrected. The plurality of views of the variance tracking report may also be analyzed in order to determine where variances are occurring on an enterprise level, a business unit level, an organization level, and a project level. Targeted action may then be taken on specific projects or enterprise methodologies in order to reduce and/or eliminate the variances.

17 Claims, 10 Drawing Sheets

| | ENTERPRISE | OCTOBER ACTUAL | NOVEMBER FORECAST | DECEMBER FORECAST | 4TH QTR | 2005 TOTAL |
|---|---|---|---|---|---|---|
| 112 | SE PATH PROJECTS | 10,411 | 18,052 | 19,442 | 47,905 | 51,097 |
| 114 | GPA BUCKETS | (28,642) | (38,469) | (35,478) | (102,609) | (160,708) |
| | GPA BUCKETS | (17,817) | (18,402) | (18,101) | (54,321) | (51,918) |
| 116 | MAINTENANCE | 3,120 | (4,421) | (1,013) | (2,314) | 7,616 |
| | SUSTAINING | (13,945) | (15,665) | (16,364) | (45,974) | (116,407) |
| 118 | STANDARD PATH PROJECTS | (23,891) | (16,226) | 29,096 | (11,021) | (634) |
| 120 | PLACEHOLDERS | (1,528) | 2,056 | 12,593 | 13,122 | 15,012 |
| | ADDED PLACEHOLDERS | 0 | 4,226 | 6,626 | 10,852 | 10,852 |
| | EARLY PLACEHOLDERS | 0 | 0 | 0 | 0 | 0 |
| 122 | ON SCHEDULE PLACEHOLDERS | (1,404) | (246) | 371 | (1,279) | (1,279) |
| | DELAYED PLACEHOLDERS | (640) | (4,771) | (2,935) | (8,346) | (8,346) |
| | CANCELED PLACEHOLDERS | 1503 | 409 | (2,772) | (861) | (877) |
| | PLACEHOLDER TO PROJECT SWAPS | (987) | 2,438 | 11,304 | 12,756 | 12,908 |
| 124 | PROJECTS WITH ESTIMATE LOES, WIP | (22,363) | (18,282) | 16,502 | (24,143) | (15,645) |
| | UNPLANNED PROJECTS | 4,042 | 7,658 | 17,389 | 29,089 | 29,809 |
| | EARLY PROJECTS | (16,666) | (6,454) | 13,992 | (9,127) | (9,937) |
| 126 | ON SCHEDULE PROJECTS | 11,059 | 4,572 | 14,731 | 30,362 | 43,616 |
| | DELAYED PROJECTS | (8,680) | (7,352) | (1,917) | (17,949) | (19,113) |
| | CANCELED PROJECTS | (8,081) | (11,052) | (19,989) | (39,122) | (42,871) |
| | ON HOLD PROJECTS | (4,037) | (5,654) | (7,704) | (17,395) | (17,148) |
| 128 | TOTAL VARIANCE | (42,122) | (36,662) | (13,060) | (65,725) | (110,245) |

| ENTERPRISE | OCTOBER ACTUAL | NOVEMBER FORECAST | DECEMBER FORECAST | 4TH QTR | 2005 TOTAL |
|---|---|---|---|---|---|
| SE PATH PROJECTS | 10,411 | 18,052 | 19,442 | 47,905 | 51,097 |
| GPA BUCKETS | (28,642) | (38,488) | (35,478) | (102,609) | (160,708) |
| GPA BUCKETS | (17,817) | (18,402) | (18,101) | (54,321) | (51,918) |
| MAINTENANCE | 3,120 | (4,421) | (1,013) | (2,314) | 7,616 |
| SUSTAINING | (13,945) | (15,665) | (16,364) | (45,974) | (116,407) |
| STANDARD PATH PROJECTS | (23,891) | (16,226) | 29,096 | (11,021) | (634) |
| PLACEHOLDERS | (1,528) | 2,056 | 12,593 | 13,122 | 15,012 |
| ADDED PLACEHOLDERS | 0 | 4,226 | 6,626 | 10,852 | 10,852 |
| EARLY PLACEHOLDERS | 0 | 0 | 0 | 0 | 0 |
| ON SCHEDULE PLACEHOLDERS | (1,404) | (246) | 371 | (1,279) | (1,279) |
| DELAYED PLACEHOLDERS | (640) | (4,771) | (2,935) | (8,346) | (8,346) |
| CANCELED PLACEHOLDERS | 1503 | 409 | (2,772) | (861) | (877) |
| PLACEHOLDER TO PROJECT SWAPS | (987) | 2,438 | 11,304 | 12,756 | 12,908 |
| PROJECTS WITH ESTIMATE LOES, WIP | (22,363) | (18,282) | 16,502 | (24,143) | (15,645) |
| UNPLANNED PROJECTS | 4,042 | 7,658 | 17,389 | 29,089 | 29,809 |
| EARLY PROJECTS | (16,666) | (6,454) | 13,992 | (9,127) | (9,937) |
| ON SCHEDULE PROJECTS | 11,059 | 4,572 | 14,731 | 30,362 | 43,616 |
| DELAYED PROJECTS | (8,680) | (7,352) | (1,917) | (17,949) | (19,113) |
| CANCELED PROJECTS | (8,081) | (11,052) | (19,989) | (39,122) | (42,871) |
| ON HOLD PROJECTS | (4,037) | (5,654) | (7,704) | (17,395) | (17,148) |
| TOTAL VARIANCE | (42,122) | (36,662) | (13,060) | (65,725) | (110,245) |

FIG. 1

| ENTERPRISE | JUL-05 | AUG-05 | SEP-05 | OCT-05 | NOV-05 | DEC-05 |
|---|---|---|---|---|---|---|
| SE PATH PROJECTS | 11386 | 14292 | 33493 | 24471 | 13413 | 7915 |
| GPA BUCKETS | (2328) | (22572) | (21719) | (17742) | (16134) | (10456) |
| STANDARD PATH PROJECTS | (31177) | (16158) | (5519) | 10095 | 18711 | 38543 |
| PLACEHOLDERS | (1993) | (6715) | (20382) | (35478) | (38731) | (25443) |
| PROJECTS WITH ESTIMATE LOES, WIP | (29184) | (9442) | 14864 | 45573 | 57442 | 63985 |
| TOTAL VARIANCE | (22116) | (24438) | 6255 | 16824 | 15990 | 36001 |

| CORPORATE | JUL-05 | AUG-05 | SEP-05 | OCT-05 | NOV-05 | DEC-05 |
|---|---|---|---|---|---|---|
| SE PATH PROJECTS | (99) | 41 | 650 | 620 | 695 | 515 |
| GPA BUCKETS | 2537 | 2416 | 2948 | (2386) | (2230) | (1642) |
| STANDARD PATH PROJECTS | (301) | (1139) | (687) | (1323) | (2580) | (1790) |
| PLACEHOLDERS | 0 | (719) | (2350) | (3721) | (3856) | (2730) |
| PROJECTS WITH ESTIMATE LOES, WIP | (301) | (420) | 1663 | 2398 | 1276 | 940 |
| TOTAL VARIANCE | 2137 | 1318 | 2911 | (3089) | (4115) | (2917) |

| FINANCE | JUL-05 | AUG-05 | SEP-05 | OCT-05 | NOV-05 | DEC-05 |
|---|---|---|---|---|---|---|
| SE PATH PROJECTS | 1067 | 1292 | 3614 | 3124 | 2733 | 3423 |
| GPA BUCKETS | (3198) | (3202) | (2752) | (10388) | (11938) | (9484) |
| STANDARD PATH PROJECTS | (8395) | (6841) | (6077) | (7233) | (12376) | (4409) |
| PLACEHOLDERS | (501) | (2736) | (7702) | (11508) | (15926) | (4861) |
| PROJECTS WITH ESTIMATE LOES, WIP | (7894) | (4105) | 1625 | 4275 | 3550 | 452 |
| TOTAL VARIANCE | (10527) | (8752) | (5216) | (14497) | (21574) | (10471) |

*FIG. 2A*

| 1ST QTR | 2ND QTR | 3RD QTR | 4TH QTR | TOTAL |
|---|---|---|---|---|
| 0 | 0 | 59171 | 45798 | 104969 |
| 0 | 0 | (46617) | (44332) | (90949) |
| 0 | 0 | (52853) | 67349 | 14496 |
| 0 | 0 | (29091) | (99652) | (128742) |
| 0 | 0 | (23763) | 167001 | 143238 |
| 0 | 0 | (40299) | 68815 | 28516 |

| 1ST QTR | 2ND QTR | 3RD QTR | 4TH QTR | TOTAL |
|---|---|---|---|---|
| 0 | 0 | 592 | 1830 | 2422 |
| 0 | 0 | 7902 | (6258) | 1644 |
| 0 | 0 | (2127) | (5693) | (7820) |
| 0 | 0 | (3069) | (10307) | (13376) |
| 0 | 0 | 942 | 4614 | 5556 |
| 0 | 0 | 6366 | (10121) | (3754) |

| 1ST QTR | 2ND QTR | 3RD QTR | 4TH QTR | TOTAL |
|---|---|---|---|---|
| 0 | 0 | 5972 | 9280 | 15252 |
| 0 | 0 | (9153) | (31802) | (40955) |
| 0 | 0 | (21314) | (24019) | (45332) |
| 0 | 0 | (10939) | (32295) | (43234) |
| 0 | 0 | (10375) | 8277 | (2098) |
| 0 | 0 | (24494) | (46541) | (71035) |

*FIG. 2B*

| SBS | | | | | | |
|---|---|---|---|---|---|---|
| SBS | OCTOBER | NOVEMBER | DECEMBER | 4TH QTR | 2005 TOTAL |
| SE PATH PROJECTS | 523 | 332 | 151 | 1,006 | 1,217 |
| GPA BUCKETS | (5,594) | (5,136) | 351 | (10,379) | (5,646) |
| GPA BUCKETS | (5,594) | (5,136) | 351 | (10,379) | (5,646) |
| MAINTENANCE | 0 | 0 | 0 | 0 | 0 |
| SUSTAINING | 0 | 0 | 0 | 0 | 0 |
| STANDARD PATH PROJECTS | (17,806) | (16,848) | (8,938) | (43,592) | (48,062) |
| PLACEHOLDERS | (585) | 416 | 1,961 | 961 | 961 |
| ADDED PLACEHOLDERS | 0 | 6 | 710 | 715 | 715 |
| EARLY PLACEHOLDERS | 0 | 0 | 0 | 0 | 0 |
| ON SCHEDULE PLACEHOLDERS | 0 | 0 | 194 | 194 | 194 |
| DELAYED PLACEHOLDERS | 0 | 0 | 0 | 0 | 0 |
| CANCELED PLACEHOLDERS | 0 | (6) | (72) | (78) | (78) |
| PLACEHOLDER TO PROJECT SWAPS | (585) | (415) | 1,129 | 130 | 130 |
| PROJECTS WITH ESTIMATE LOES, WIP | (17,221) | (16,432) | (10,900) | (44,553) | (49,022) |
| UNPLANNED PROJECTS | 53 | 147 | 343 | 543 | 555 |
| EARLY PROJECTS | (6,042) | (3,048) | 1,099 | (7,990) | (10,644) |
| ON SCHEDULE PROJECTS | 1,057 | 1,042 | 3,334 | 5,433 | 7,268 |
| DELAYED PROJECTS | (6,927) | (7,784) | (3,187) | (17,898) | (19,605) |
| CANCELED PROJECTS | (4,977) | (6,381) | (11,980) | (23,338) | (25,207) |
| ON HOLD PROJECTS | (385) | (408) | (510) | (1,302) | (1,389) |
| TOTAL VARIANCE | (22,877) | (21,652) | (8,436) | (52,965) | (52,490) |

FIG. 3

| LTD | OCTOBER | NOVEMBER | DECEMBER | 4TH QTR | 2005 TOTAL |
|---|---|---|---|---|---|
| SE PATH PROJECTS | 2,211 | 1,641 | 1,539 | 5,391 | 8,328 |
| GPA BUCKETS | (2,896) | (3,906) | (8,770) | (15,572) | (15,477) |
| GPA BUCKETS | (2,896) | (3,906) | (8,770) | (15,572) | (15,477) |
| MAINTENANCE | 0 | 0 | 0 | 0 | 0 |
| SUSTAINING | 0 | 0 | 0 | 0 | 0 |
| STANDARD PATH PROJECTS | (2,999) | (1,181) | 4,501 | 321 | 3,197 |
| PLACEHOLDERS | 806 | 5 | (1,398) | 587 | 1,323 |
| ADDED PLACEHOLDERS | 0 | 0 | 0 | 0 | 0 |
| EARLY PLACEHOLDERS | 0 | 0 | 0 | 0 | 0 |
| ON SCHEDULE PLACEHOLDERS | 0 | 0 | 0 | 0 | 0 |
| DELAYED PLACEHOLDERS | (54) | (424) | (803) | (1,281) | (1,281) |
| CANCELED PLACEHOLDERS | 1,576 | 909 | (653) | 1,832 | 3,570 |
| PLACEHOLDER TO PROJECT SWAPS | (716) | (480) | 58 | (1,139) | (966) |
| PROJECTS WITH ESTIMATE LOES, WIP | (3,805) | (1,185) | 5,899 | 909 | 1,874 |
| UNPLANNED PROJECTS | 838 | 2,019 | 3,306 | 6,164 | 6,276 |
| EARLY PROJECTS | (1,757) | (484) | 4,339 | 2,098 | 4,294 |
| ON SCHEDULE PROJECTS | (1,129) | (783) | 1,055 | (857) | (701) |
| DELAYED PROJECTS | 187 | 28 | (836) | (621) | (1,217) |
| CANCELED PROJECTS | (1,744) | (1,797) | (1,845) | (5,386) | (6,289) |
| ON HOLD PROJECTS | (201) | (169) | (121) | (491) | (488) |
| TOTAL VARIANCE | (3,684) | (3,445) | (2,730) | (9,859) | (3,952) |

*FIG. 4*

| MBU ▼ | GAIN LOSS CATEGORY ▼ | JUL | AUG | SEP | OCT | NOV | DEC |
|---|---|---|---|---|---|---|---|
| CCS | SE PATH PROJECTS | (99) | 41 | 650 | 620 | 695 | 515 |
| | GPA BUCKETS | 2,537 | 2,416 | 2,948 | (2,386) | (2,230) | (1,642) |
| | ADDED PLACEHOLDERS | 0 | 0 | 0 | 608 | 2,927 | 1,302 |
| | DELAYED PLACEHOLDERS | 0 | (20) | (833) | (1,082) | (1,805) | (1,658) |
| | CANCELED PLACEHOLDERS | 0 | (699) | (1,517) | (3,247) | (4,978) | (2,374) |
| | UNPLANNED PROJECTS | 671 | 961 | 2,282 | 2,635 | 663 | 283 |
| | EARLY PROJECTS | 77 | 55 | 186 | 2 | 0 | 0 |
| | ON SCHEDULE PROJECTS | 23 | 7 | 0 | 0 | 0 | 0 |
| | DELAYED PROJECTS | (129) | 284 | 845 | 677 | 703 | 732 |
| | CANCELED PROJECTS | 39 | 38 | 0 | 0 | 0 | 0 |
| | ON HOLD PROJECTS | (982) | (1,764) | (1,650) | (916) | (90) | (75) |
| CCS TOTAL | | 2,137 | 1,318 | 2,911 | (3,089) | (4,115) | (2,917) |
| FIN | SE PATH PROJECTS | 1,067 | 1,292 | 3,614 | 3,124 | 2,733 | 3,423 |
| | GPA BUCKETS | (3,290) | (3,308) | (2,752) | (10,388) | (11,930) | (9,484) |
| | MAINTENANCE | 92 | 106 | 0 | 0 | 0 | 0 |
| | ADDED PLACEHOLDERS | 0 | 0 | 792 | 2,881 | 4,099 | 7,604 |
| | ON SCHEDULE PLACEHOLDERS | 0 | 0 | 0 | 0 | 0 | 0 |
| | DELAYED PLACEHOLDERS | (173) | (140) | (685) | (3,269) | (1,509) | (1,182) |
| | CANCELED PLACEHOLDERS | (328) | (788) | (4,033) | (4,542) | (9,998) | (7,689) |
| | PLACEHOLDER TO PROJECT SWAPS | (1,808) | (1,808) | (3,776) | (6,578) | (8,518) | (3,593) |
| | UNPLANNED PROJECTS | 925 | 2,236 | 3,254 | 6,944 | 6,050 | 6,857 |

*FIG. 5*

| BUSINESS UNIT | GAIN/LOSS CATEGORY | PROJECT ID | VAR OCT | VAR NOV | VAR DEC |
|---|---|---|---|---|---|
| CCS | SE PATH PROJECTS | D0247 | 0 | 0 | 0 |
| CCS | SE PATH PROJECTS | D0248 | 0 | 0 | 0 |
| CCS | SE PATH PROJECTS | D0392 | -177.95 | -330 | -300 |
| CCS | SE PATH PROJECTS | D1181 | 0 | 0 | 0 |
| CCS | SE PATH PROJECTS | D1183 | 0 | 0 | 0 |
| CCS | SE PATH PROJECTS | D2566 | 0 | 0 | -143 |
| CCS | SE PATH PROJECTS | D2951 | -58.5 | 0 | 0 |
| CCS | SE PATH PROJECTS | D5330 | | 1054 | 1665 |

SYSTEM AND METHOD FOR ANALYSIS OF PROJECT VARIANCES

CROSS-REFERENCE TO RELATED APPLICATIONS

This application includes subject matter related to U.S. patent application Ser. No. 11/195,964, filed on Aug. 3, 2005, entitled "Spreading Algorithm for Work and Time Forecasting," by Michael W. Kanemoto et al, which is hereby incorporated by reference for all purposes.

BACKGROUND

An enterprise may have numerous business units, wherein each business unit may have numerous organizations, and each organization may work on a plurality of projects. Tracking and managing projects using project development systems or tools may be useful to project management and may improve the efficiency of the enterprise. These projects may deviate, for various reasons, from a planned budget of time, cost, and resources. To date there has been no effective way to track variances in certain aspects of these projects.

SUMMARY

Disclosed herein is a variance monitoring system that comprises memory that stores variance monitoring software and a processor coupled to the memory to execute the variance monitoring software. The variance monitoring software configures the processor to gather baseline effort data and revised effort data associated with specific projects. For each project a variance is determined between the baseline effort data and the revised effort data. The variance is determined as a function of time. The specific projects are categorized into a hierarchy having categories for at least placeholder projects and started projects. The variance is presented as a function of time for each category for at least one level in the hierarchy.

Further disclosed herein is variance tracking analysis method that comprises viewing a variance tracking report showing for each category in a set of categories a variance value for each month in a quarter. The set of categories includes at least placeholder projects and started projects. The method includes selecting a category to view variance values for individual projects in that category, and initiating corrective action for projects identified as having problematic variance values.

Still further disclosed herein is a method comprising projecting a resource expenditure over each of a plurality of units of time over the course of a project based on a resource budget. The resource expenditure may further be based on a definition of a duration of project phases as a percentage of a total project duration, a project start date, a project end date and an estimate of a percentage of resources to be expended during each project phase. Generating a variance tracking report having, for each of a plurality of categories, a monthly value for variance between the projected resource expenditure and an actual or forecast resource expenditure, wherein the monthly value indicates actual variances for past months and forecast variances for future months.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, but may be modified within the scope of the appended claims along with their full scope of equivalents.

Disclosed herein is a variance tracking report that provides a new and useful view of an enterprise's project planning and project implementation. The present disclosure provides for tracking and analyzing projects at the earliest stages, such as before the project is approved, budgeted, and so on. By managing and monitoring projects starting at earlier stages, additional information may be obtained, such as data about early transitions in project development, or churn, i.e. the number of projects that do not get budgeted, or the costs of these never budgeted projects, for example. The variance tracking report may indicate variances from a planned work schedule and be used to explain the causes of any variances between projected and actual budgets as well as causes for variances in project milestone dates. Milestone dates refer to the timing of projects being any of early, on schedule, delayed, etc. A project budget may include financial goals and limits that may be expressed as resource management goals and limits. Some such resources may include personnel, equipment, space allocation, etc.

The variance tracking report may be hierarchically organized from an enterprise level all the way down to an individual project level. This level of granularity allows for targeted action to be taken on individual projects in order to correct for variances. At the same time, higher level views of the variance data may expose trends associated with project planning or implementation methodology that may be adjusted in order to minimize variance. The variance tracking report may also show how current and past changes in how the enterprise plans or implements projects may impact future projections so the enterprise can give a clear indication of how any variances are being corrected. The variance tracking report may also be utilized to generate "what-if" scenario planning in order to determine the best strategy for correcting any variances.

By tracking the variances in the earlier stages of project development along with projects being implemented, discrepancies between how projects are being planned and how they are actually being implemented may be exposed. Through examining the variance tracking report, the reasons for variance at all stages in a project lifecycle may be determined. This examination may lead to better planning and implementation of projects that in turn may result in a reduced amount of variance. As such, the variance tracking report is not only a forecasting tool to show projections of the direction that the enterprise is heading, but it is also a planning tool to enable the enterprise to be placed back on track in the event of variances.

FIGS. 1-6 depict illustrative views of a variance tracking report that provides variance tracking. It is important to track variances to a planned work schedule since any variance to a planned work schedule may require additional operational expense to correct. Since some enterprises bill an hourly basis, the more hours it takes to complete a project, the more money the enterprise or business unit may appear to earn. However, most enterprises have a nearly constant number of employees, so if more time needs to be used for one project, then less time may be available on another project. The neglect on the other project may need to be corrected for in the future which may in turn impact other projects. The variance caused by the original deviation or variance from a plan may propagate across the entire enterprise for many months. Also, variances cause expenses due to changes in completion dates for projects. For example, if a project is running late then the enterprise may be penalized by the client and thus earn less profit than was projected.

The variance tracking report may track variances in "man-hour" units. Using the man-hours as the metric for showing variance is useful since it provides an indication of both the financial implications and operational implications of the variance. This makes the variance tracking report useful for all of the investors, clients and many different people in the enterprise itself. For example by showing the variance in man-hours, a clear indication is given to the client about how the enterprise is spending their time on the client's project/activity as well as whether or not the project is on budget. Also, showing the variance in man-hours gives an indication to investors of a link between the operations of the enterprise and the financial viability of the enterprise. This may be expressed as possible profits or losses of the enterprise since the amount of money an enterprise is earning may be directly related to the amount of time that is being spent working on projects. For example, if an enterprise bills on an hourly basis, then spending less time working on a project than was projected means the enterprise is making less money on that project than was projected.

Using man-hours as the metric for measuring variance also gives a common point of communication between various people within the enterprise and provides a clear indication of how the enterprise should redirect its efforts. As mentioned above, the number of man-hours worked on a project may be directly proportional to the amount of money that is earned for that project. As such, the variance tracking report may provide useful information to employees on an executive level as well as employees in accounting. The hierarchical organization of the variance tracking report, described in more detail below, provides both summary views for executives as well as detailed line item views for each project that may be useful for accounting. Also, by using man-hours the variance tracking report provides a clear indication of a level-of-effort that is being spent on each project. The project managers responsible for implementing each of the projects may then more easily decide what must be done in order to get back to a baseline for each of their projects that have a variance, whether it means working more or less hours, increasing productivity, adapting management techniques, hiring more employees, etc.

To generate the variance tracking report showing variances as described above, a baseline of what is expected of the enterprise is first set. The baseline may be set based on a determination of a number of projects that are to be completed, a level of effort to complete each project, or any other metric or combination of metrics from which to determine the baseline of what is expected of the enterprise. The variances may be calculated by subtracting a baseline from actual or projected work. In one embodiment, the baseline for an entire quarter is set as a snapshot of the current state of the enterprise at the end of the previous quarter. In another embodiment, a spreading algorithm may be used to set a baseline by determining an estimated amount of resource consumption per unit time for the enterprise, described in detail below. The information necessary to determine the baseline may be obtained from one or more databases in the enterprise.

In one embodiment, the variance tracking report hierarchically shows variances from a projected baseline on a quarterly basis. In the last month of the previous quarter, projections are made as to variances in the coming quarter. These projections may be based on trends exposed throughout the previous quarter and anticipated events such as project completion and new project initiation. At the close of each month in the current quarter, the actual variances from the previous month are imported to the variance tracking report from one or more databases. The databases may include data for storing the baseline for each project, as well as budget and expense data for each project in the enterprise.

In an alternative embodiment, the projected variances for the remaining month(s) in the quarter may be updated based on trends exposed by the actual variances in the current quarter. Based on the trends exposed each quarter or each month, the enterprise can reset expectations to their clients and investors. Further, based on the trends exposed, the enterprise may perform "what-if" scenario planning in order to determine the best strategy for correcting variances and take targeted action on specific projects to realign projections back to the baseline.

Figure 1:
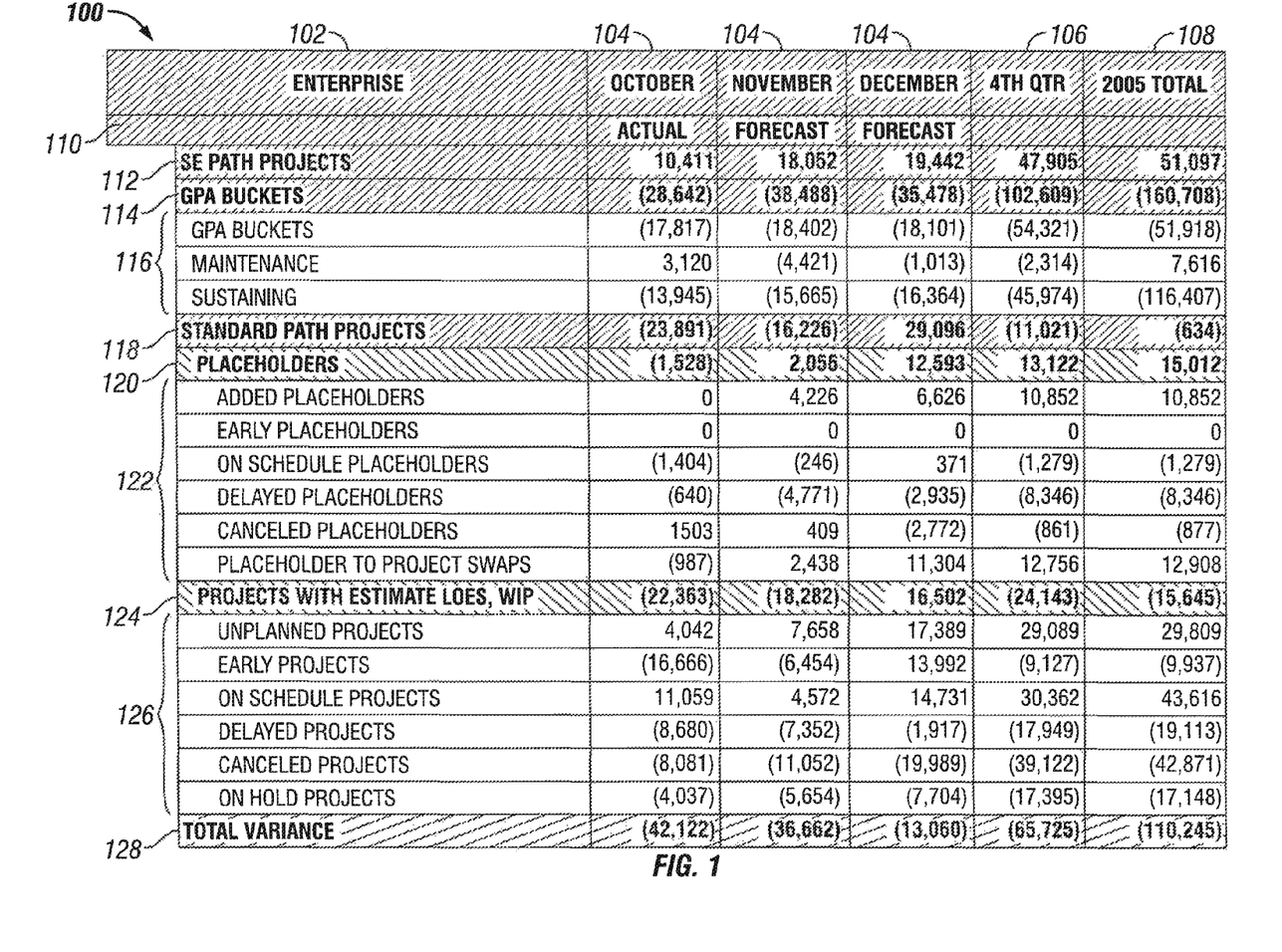
FIG. 1 depicts an illustrative view of a variance tracking report on an enterprise level.

FIG. 1 depicts an illustrative variance tracking report 100 on an enterprise level. The report 100 shows variance from a baseline in man-hours wherein positive numbers indicate more hours worked than were projected for an activity and negative numbers indicate less hours worked than were projected for an activity. In particular, each cell value of the report 100 is calculated based on an actual (or projected) value minus the baseline value. It is noted that any other metric may be used to show the variance such as a dollar amount. Further any other algorithm may be used to show a variance from a baseline such as a standard deviation.

As shown in FIG. 1 element 102 indicates the hierarchy level of the report. In the example shown in FIG. 1 the report is shown to be on an enterprise level. Element 104 indicates columns corresponding to the months of the current quarter. Element 106 indicates a column corresponding the current quarter and element 108 indicates a column corresponding to the current year. Element 110 indicates which months have actual variances and which months are still projected or forecast variances. In the example shown in FIG. 1, the month of October has ended and therefore actual variances are imported for the column under October. Also shown, the months of November and December are still projected numbers meaning that those months have not ended yet.

For months with actual variance data, the enterprise can explain at the month end close where the variances to the baseline came from in detail or aggregate. In the example of FIG. 1, it is easy to see in October that the majority of the variance came from GPA Buckets (defined below) and work-in-progress (WIP) projects. Lower level views of the variance tracking report described below may then be used to see in detail the causes of these variances and explain and/or correct the variances.

Within the enterprise the variances are grouped by categories, macro categories, and subcategories wherein column 106 totals the variance for each category, macro-category, and subcategory for the quarter and column 108 likewise totals the variance for the year. The categories shown in the example of FIG. 1 are indicated by elements 112, 114, and 118.

Category 112 is for Small Enhancement (SE) Path Projects which are for making small enhancements on projects. Note that this category is always positive since this example makes no baseline projections for the SE Path Projects. Therefore the baseline is zero hours and any hours spent on these projects results in a positive variance from the baseline.

Category 114 is for General Project Authorization (GPA) Buckets which are funding buckets that are given a lump number of hours for a given time period, such as a month, quarter, or a year, in order to complete any projects falling in one of the subcategories 116. The GPA Buckets subcategory 116 spawn GPA Iterations, which are smaller projects than the SE Path Projects that are attached to the GPA Bucket funding. These projects may be as simple as changing a font on a form or updating a screensaver, for example. Also included are Maintenance for maintaining production and Sustaining for governance, project management, oversight, planning, and management activities. By adding together all of the variances in a particular column of the subcategories 116, the value shown for the corresponding column in the category 114 is determined.

Category 118 is for Standard Path Projects which are projects that go through standard protocols of the enterprise in order to be modeled and worked on. Note that category 118 has two macro categories indicated by elements 120 and 124. Macro-category 120 indicates Placeholders which are projects that are being modeled and waiting in line to be worked on as of the beginning of the quarter. In one embodiment, placeholders are used for projects for which planning has not yet reached the phase of creating a formal estimate of level of effort based on the details of the project itself. Placeholders may also be used until a project is formally a work in progress (WIP) which might occur after a contract is agreed upon between the development organization and the sponsoring business organization. Placeholders provide the ability to reserve resources and monitor the placeholders for variance and other reporting purposes. Macro-category 120 can be broken down into the subcategories 122. Variances shown in the placeholders subcategories 122 indicate changes to the plan for implementing the projects, for example by adding new projects, canceling projects, changing project timelines, and changing the scope of the projects. By adding together all of the activities in a particular column of subcategories 122 together, the value shown for the corresponding column in the category 120 is determined.

Macro-category 124 indicates work-in-progress (WIP) Projects with Estimated Levels of Effort (LOEs) which are projects that are currently being worked on. Macro-category 124 can be broken down into the subcategories 126. By adding together all of the activities in a particular column of subcategories 126 together, the value shown for the corresponding column in the category 124 is determined. An estimated LOE may be an estimated number of man-hours needed to complete a project, an estimated amount of money needed to complete the project, or any other metric for determining a level of effort for a project. It is noted that the estimated LOE for a project may be used as the baseline for that project.

Category 128 shows the total variance for each column, wherein the value of each column in category 128 is found by adding together the values in the corresponding column for each of the categories 112, 114, and 118. As shown in October there was a total variance of 42,122 hours less work than what was projected for the month.

The various categories are carefully selected in order to provide a detailed understanding of the projects being worked on in the enterprise. Looking at subcategories 116, there is a subcategory for GPA Buckets, Maintenance, and Sustaining. Note that each of the subcategories 116 fall under the GPA Buckets category 114 and as such they all are related to smaller projects that are allocated by lumps of hours over a time period. The GPA Buckets subcategory may be a miscellaneous category for lumping all of the smaller projects that don't fit into the other subcategories. The Maintenance subcategory may be for work related to maintaining projects and systems that have already been completed by the enterprise. The Sustaining subcategory may be for work related to work performed by managers and the governance of employees.

Looking now at subcategories 122 under the Placeholders macro-category 120, there is a subcategory for Added, Early, On schedule, Delayed, and Canceled Placeholders and Placeholder to Project Swaps. Note that each of the subcategories 122 fall under the Placeholders macro-category 120 and as such they all are related to projects that are being modeled and are waiting in line to be worked on. The Added Placeholders subcategory indicates work related to modeling new projects that are placed in queue to be worked on. The Early Placeholders subcategory indicates work on projects where the start date has been moved up in the queue. The On Schedule Placeholder subcategory indicates work on projects that are on schedule to be worked on in the queue as projected. Variances shown in the On Schedule Placeholder subcategory may be caused by changes in the scope of the project, for example. The Delayed Placeholders subcategory indicates work on projects where the start date has been pushed back in the queue. The Canceled Placeholders subcategory indicates work on projects that are canceled from being worked on further. The Placeholder to Project Swaps subcategory indicates variance between a modeled amount of work a project is predicted to have and an estimated LOE for actually implementing the project. For example, in the month of October projects that were converted from a placeholder to work-in-progress (WIP) projects have an estimated LOE of 987 hours less than what was originally modeled for the project.

In subcategories 126 under the WIP projects macro-category 124 there is a subcategory for Unplanned, Early, On Schedule, Delayed, Canceled, and On Hold Projects. The Unplanned Projects subcategory indicates work related to completing unplanned projects that were not previously placeholders. The Early Projects subcategory indicates work on projects where the start date has been moved earlier. As shown in FIG. 1 the variance for the early and delayed subcategories of either macro-category 120 or 124 can be either positive or negative. For example, in the early subcategory under macro-category 124, a positive variance is shown if work is being completed on a project(s) in a month wherein the project was projected to be done in a later month. A negative variance is shown if work is being completed on a project(s) in a month wherein the project was projected to be completed in that month, but the work had already been completed previously. As shown in FIG. 1, for the month of October a project or group of projects were scheduled to be worked on in October and take a total of 16,666 hours to complete, but the project(s) may have been completed early in September. This would then cause the month of September to show a positive variance of 16,666 hours and October would show a negative variance of 16,666 hours for work on the early project(s).

The On Schedule Projects subcategory indicates work on projects that are being worked on as projected. As shown in FIG. 1, many more hours are being spent working on the project(s) in this subcategory than were projected. This may indicate that the method for determining the LOE for projects may not be accurate, or that the workers on those projects are being mismanaged or are inefficient, or a number of other possibilities. The Delayed Projects subcategory indicates work on projects where the start date has been moved later. The Canceled Projects and the On Hold Projects subcategories both always indicate negative variances created by not working on project(s) that were projected to be worked on. For example in the Canceled subcategory for the month of October, there were 8,081 hours of work planned on project (s) that were canceled and as such there is a variance of 8,081 hours less work than the baseline.

As described above, the variances are organized in the variance tracking report into common categories at various levels of the enterprise in order to easily extract meaning from the variance data. For example, by tracking the variances in both placeholder and work-in-progress categories, discrepancies between how projects are being planned and how they are actually being implemented may be exposed. These discrepancies may be caused by, for example, unproductive workers, poor management, incorrect planning methodology, the setting of unrealistic goals, or any number of reasons. Through examining the variance tracking report, the reasons for variance caused by difference in placeholder projects and work-in-progress projects may be determined. This examination may lead to better planning and implementation of projects that in turn may result in a reduced amount of variance. For example, if there is a particular project that is showing variance then targeted action may be taken on that particular project. However, if a group of projects or projects across the whole enterprise are showing similar variances then this may be an indication of an error in planning methodology, for example.

In another example, meaning may be derived from the categorization of the variance in order to assist in explaining why there are variances. As noted above, the Unplanned Projects subcategory shows variances of work on projects that did not go through the normal planning cycle of the enterprise. If a set of skilled workers was taken off of an On Schedule project in order to work on the Unplanned project, then variances may be caused in the On Schedule project by having less skilled workers performing less efficiently and therefore creating positive variance on the project, for example.

It is noted that the categories, macro categories, and subcategories are hierarchical in nature. In particular, if a project fits in multiple categories then it will be classified based on the category that is highest on the list. For example, if a project can be classified as both a Standard Path Project and a SE Path Project then it would ultimately be classified in the variance tracking report as an SE Path Project. Similarly the same kind of hierarchy can be applied to the macro categories and subcategories. This hierarchical categorization of the projects ensures that there is no overlap between the categories and the variances are not double counted.

Further, while specific categories were described above it is noted that any other category, macro-category, or subcategory may be added or removed from the variance tracking report. In particular, the categories of one enterprise may be inconsequential or not exist for another enterprise. As such, the variance tracking report may be tailored for the enterprise it is being used to describe. An example of an additional subcategory that may be added is a Project Swap indicating variances caused by business units or organizations within the enterprising swapping projects. Also, it is noted that the milestone subcategories (early, on time, or delayed projects or placeholders) may be measured against project completion dates rather than project start dates.

Figure 2A:
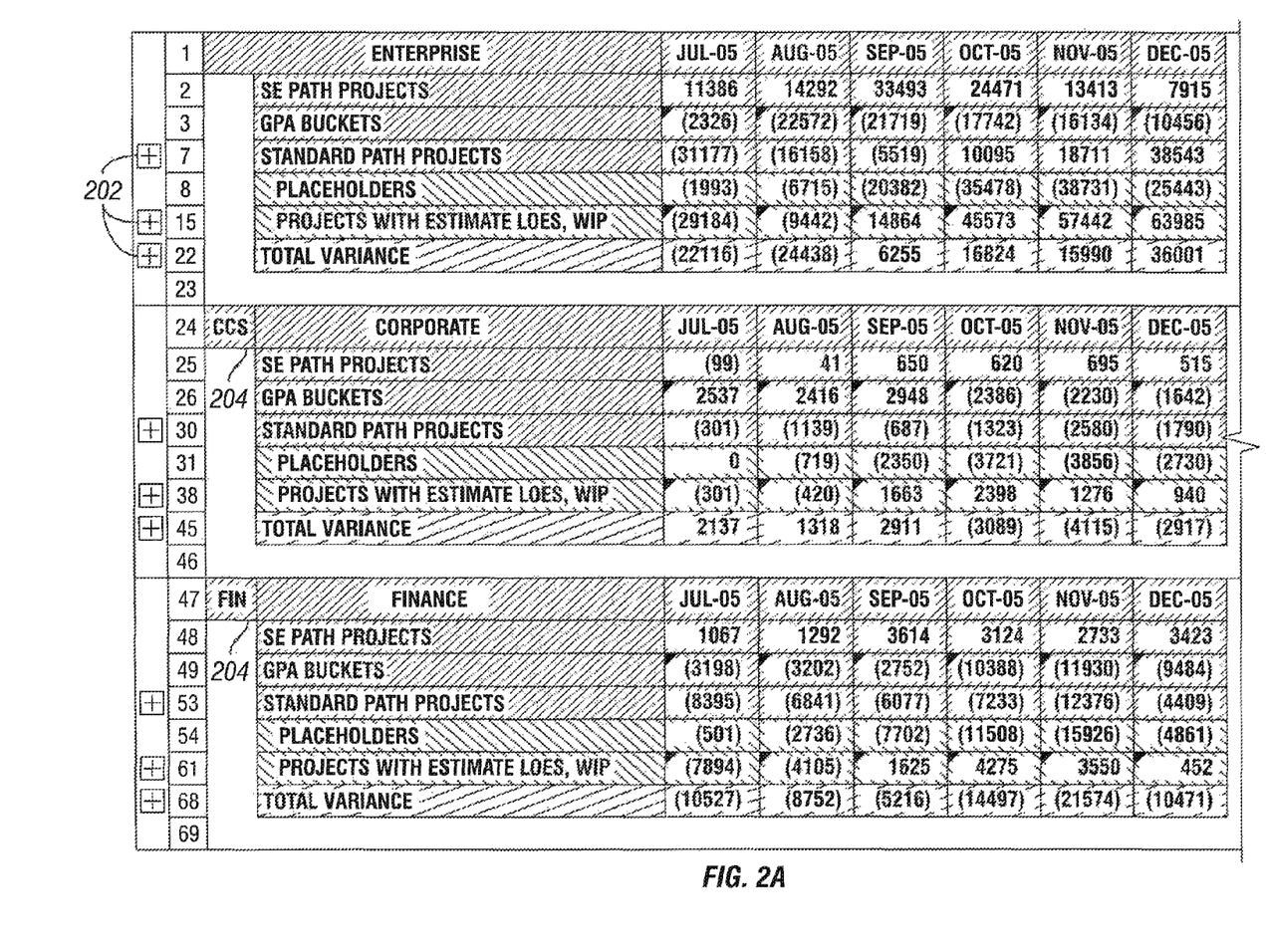
FIGS. 2A and 2B depicts another illustrative view of a variance tracking report showing an enterprise level summary and various business unit level summaries.
Figure 2B:
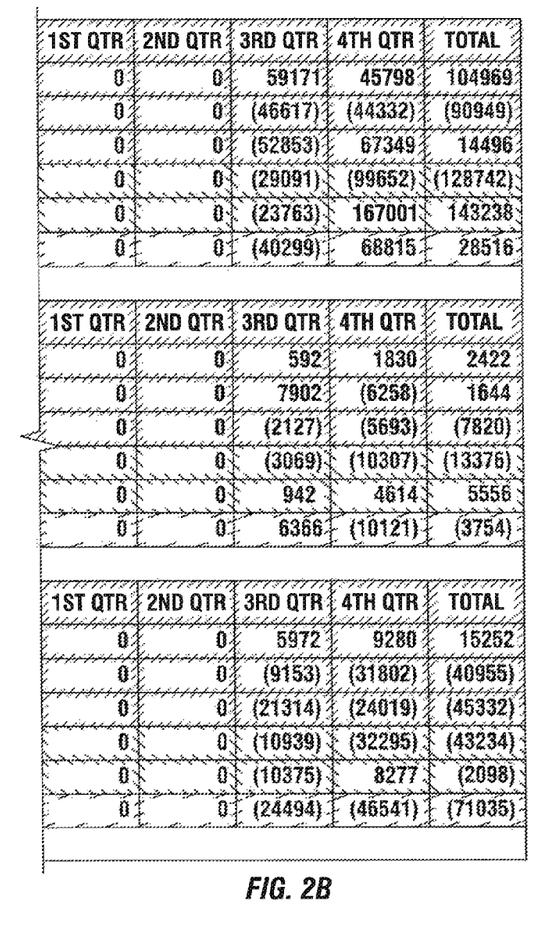

While the variance tracking report of FIG. 1 is shown in an expanded view with all of the macro categories and subcategories shown, it is noted that the variance tracking report may be organized into a collapsible tree structure as shown in FIGS. 2A and 2B. By selecting or deselecting any of icons 202, the corresponding section of the variance tracking report may be expanded or collapsed as desired. Further shown in FIGS. 2A and 2B is the variance tracking report with a collapsed view of the various businesses units 204 within the enterprise. Further detail of each business unit 204 may be shown by expanding each of the corresponding icons 202. It is noted that business units may further be broken down into various organizations within the business unit. As such, another view of the variance tracking report may be generated corresponding to the view shown in FIGS. 2A and 2B with each of the organizations within a particular business unit. For example, for each business unit, the total variances for the business unit may be displayed with each of the organizations within the business unit displayed below the business unit, similar to the way that the business unit variances were displayed below the enterprise variance in FIGS. 2A and 2B.

Figure 3:
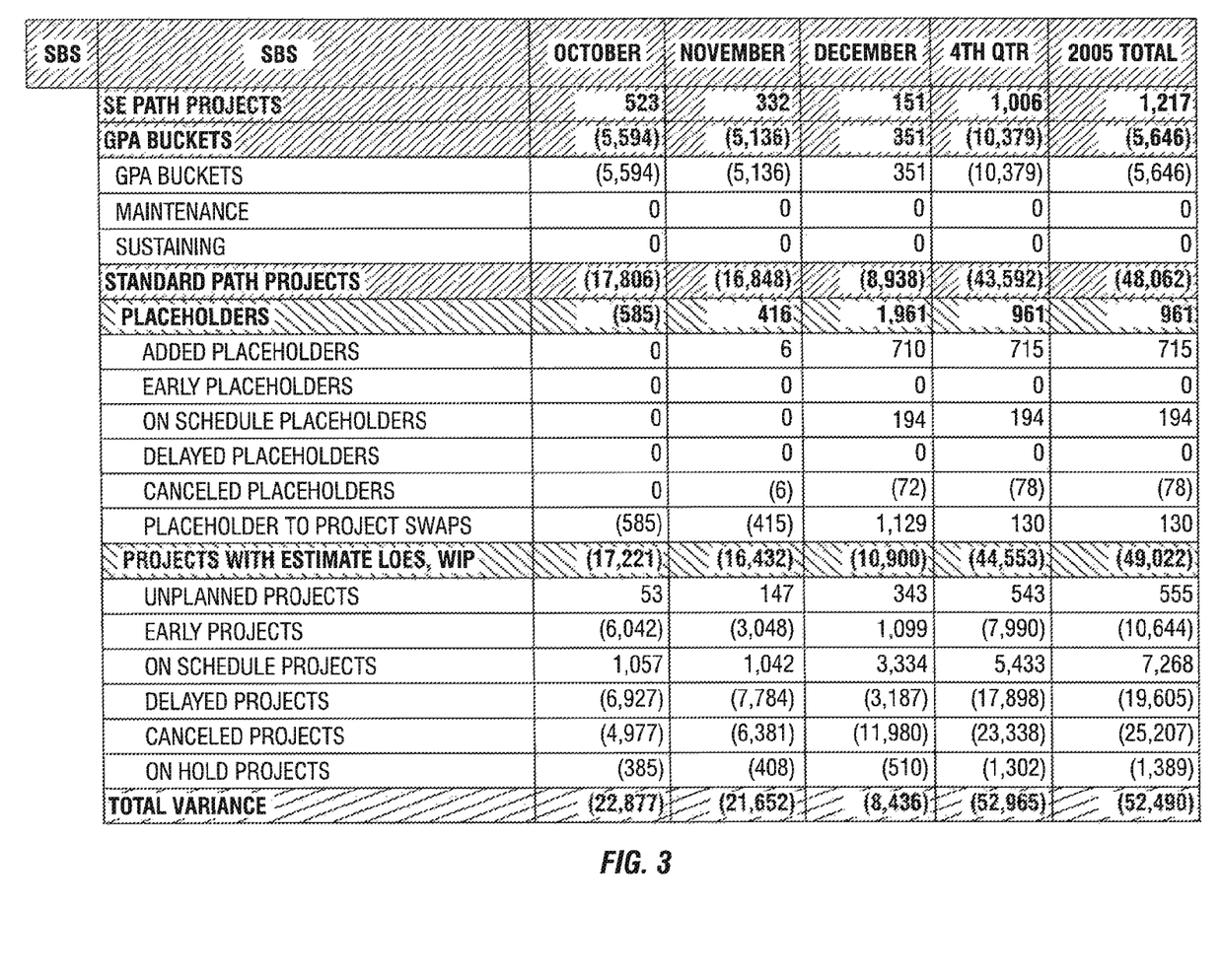
FIG. 3 depicts an illustrative view of a variance tracking report for a client SBS.
Figure 4:
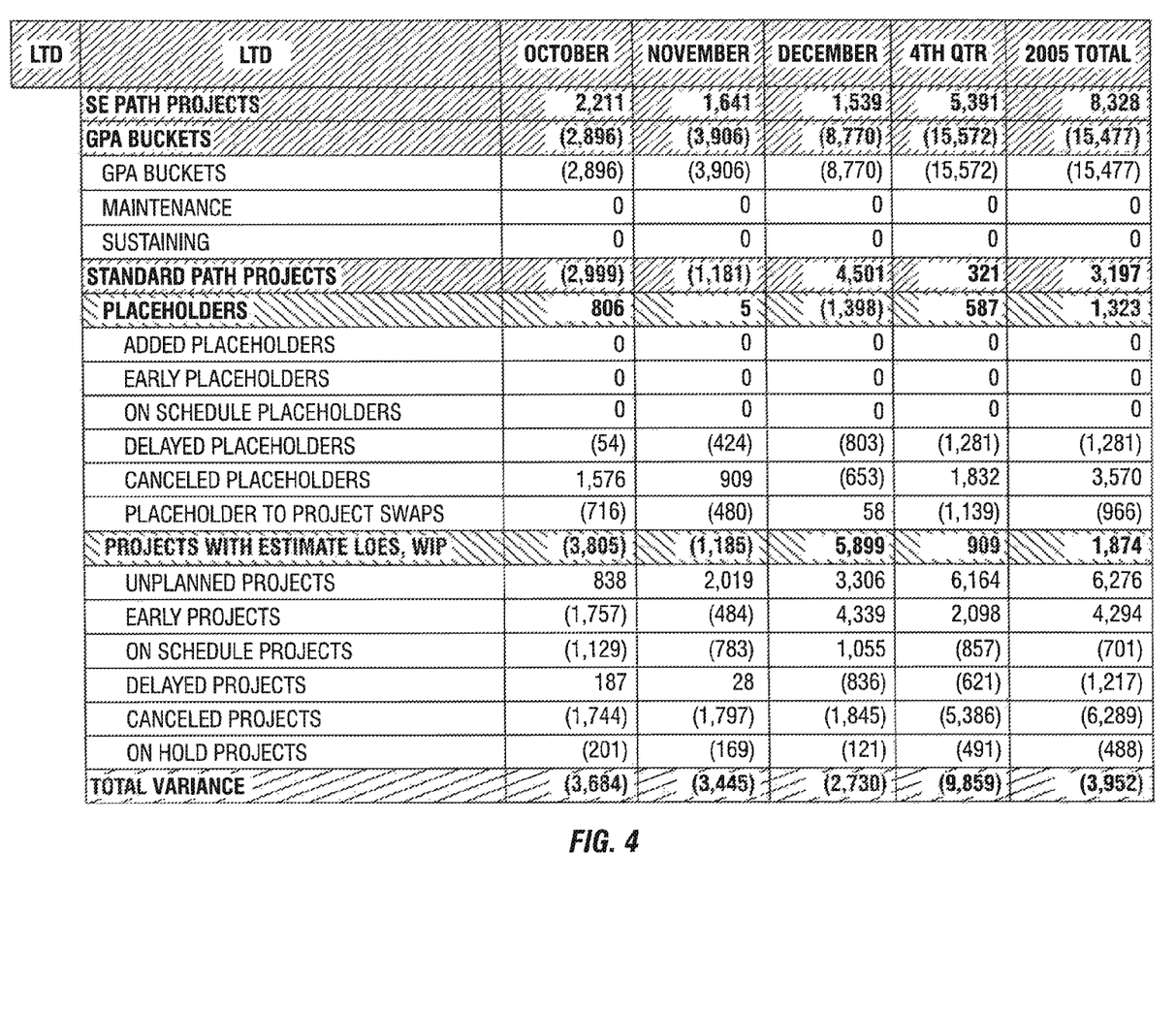
FIG. 4 depicts an illustrative view of a variance tracking report for a client LTD.

FIGS. 3 and 4 depict views of the variance tracking report of two such business units 204. These views show all of the detail that was described with regard to the enterprise view in FIG. 1, but are on the business unit level. By examining FIGS. 3 and 4, it may quickly be determined that about half of the total variance for the enterprise is from projects for one business unit, namely the "SBS" business unit. This can also be seen in the view shown in FIGS. 2A and 2B. In order to take targeted action to correct for the variances in the projects for the "SBS" business unit or other business unit, additional views of the variance tracking report such as those shown in FIGS. 5 and 6 may be provided.

Figure 5:
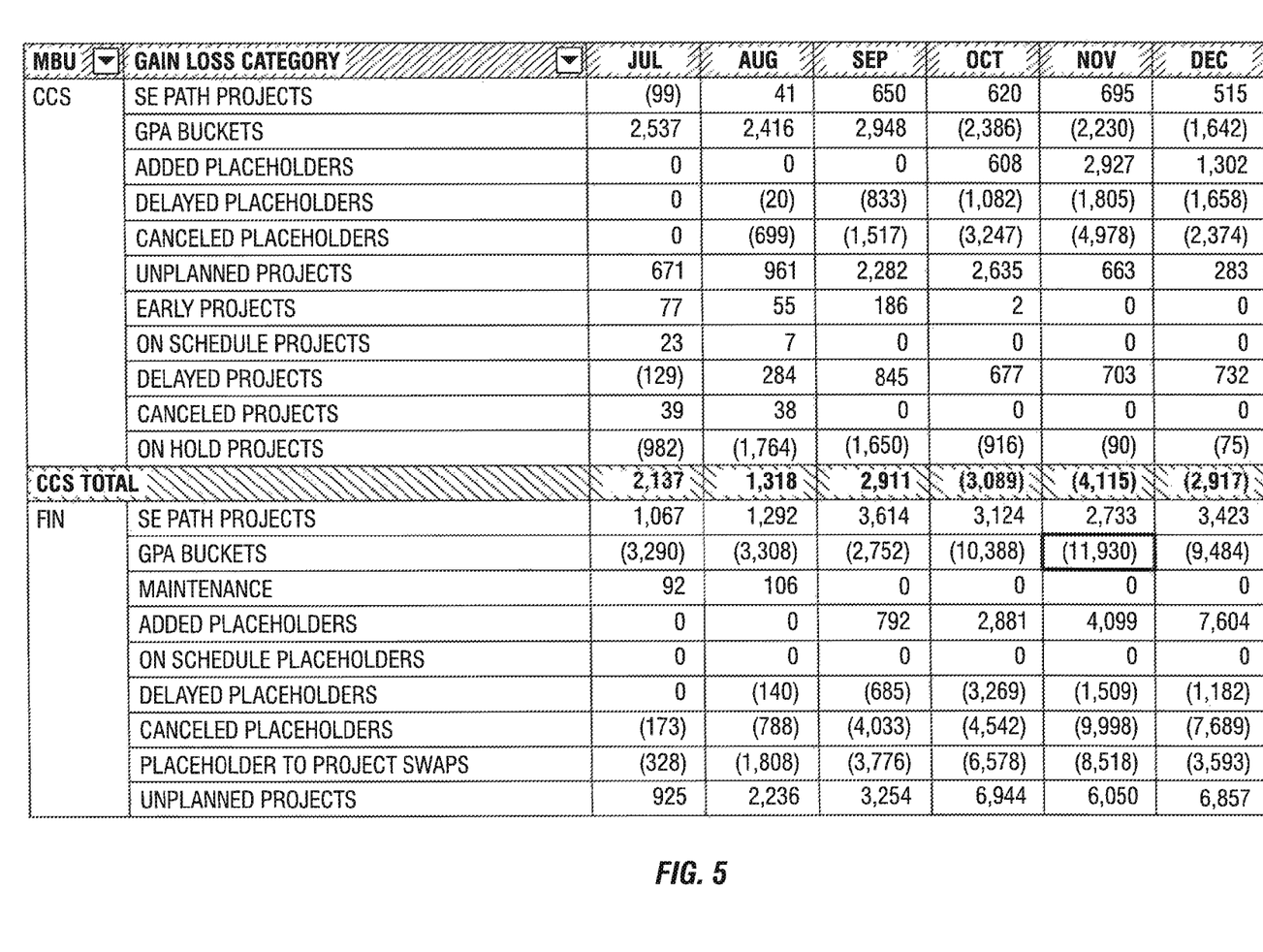
FIG. 5 depicts an illustrative pivot table view of a variance tracking report on a business unit level.

FIG. 5 depicts a pivot table view of the variance tracking report that may be used to see details at the project level. Each of the variance tracking categories from the view of FIG. 1 are shown for each business unit within the enterprise. By selecting one of the variance tracking categories the view shown in FIG. 6 may be brought up. The selection may be accomplished by double-clicking any of the cells in a corresponding category, for example, or any other known method for selecting displayed items.

Figure 6:
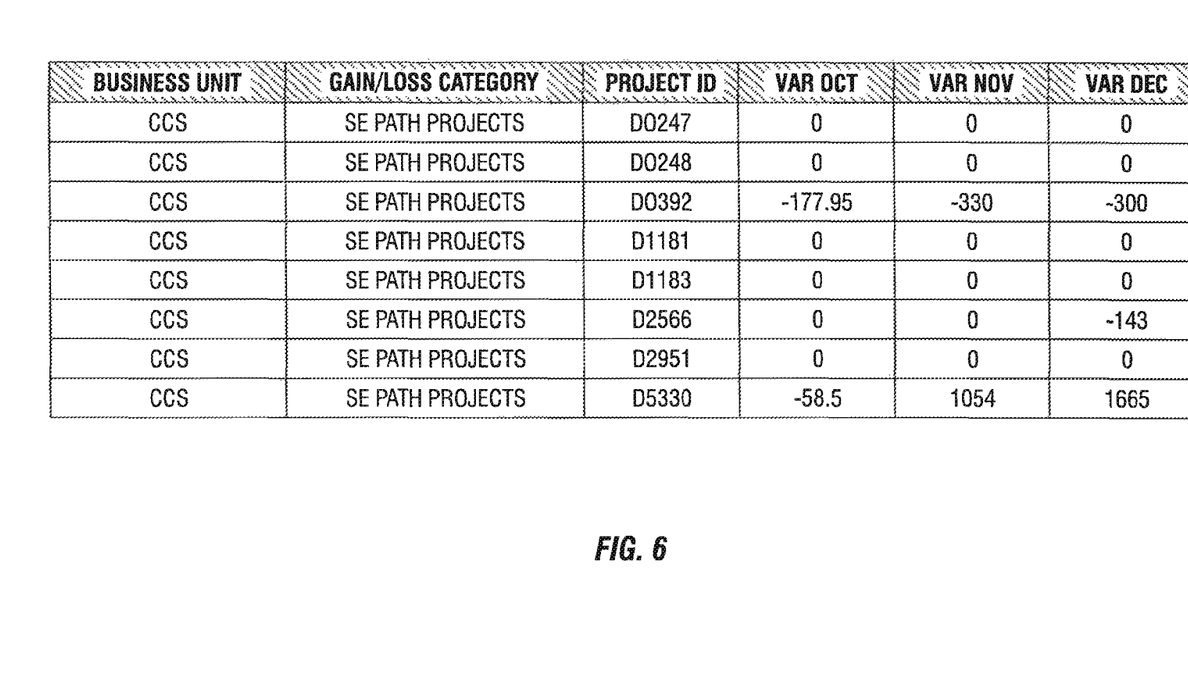
FIG. 6 depicts an illustrative view of a variance tracking report on a project level for a selected category.

FIG. 6 depicts an illustrative view of the result of selecting the SE Path Projects category in the "CSS" business unit in FIG. 5. As shown in FIG. 6 all of the projects within the selected category for that business unit are listed with their variances. By examining the list in FIG. 6, two projects in particular are seen to be causing a majority of the variance for the SE Path Projects in the "CSS" business unit. Therefore, targeted action may be taken on projects D0329 and D5330 in order to greatly reduce the variance. This may be accomplished, for example, through notifying a vice president of the "CSS" business unit or directly notifying a supervisor of the individual projects to correct for their variances and provide explanation as to the cause of the variances. The vice president or supervisor of the project may then make appropriate adjustments in order to reduce or eliminate the variance. Some such adjustments may be to change the managing style for the employees working on those projects, supplement or decrease workers, or simply provide a sufficient explanation as to the cause of the variance such as an authorized change in the scope of the project. A similar selection as that described in conjunction with FIG. 5 may be made at each of the previously described views of the variance tracking report. Upon making such a selection a list corresponding to that shown in FIG. 6 would be displayed for the corresponding view. For example, if a category was selected on the enterprise level, then each of the projects throughout the enterprise for that category would be displayed similarly to the projects listed in FIG. 6.

As the variance tracking report is hierarchically organized from the enterprise level all the way down to a project level, targeted action may be taken on individual projects in order to realign projections back to the baseline. Further, because of the hierarchical organization of variances, any variances on a project level can be easily discovered. By enabling the variances to be viewed down to a project level, variances may be seen that may otherwise be canceled out on higher levels.

It is noted that each of the views described above may be organized as different sheets or tabs in a spreadsheet application such as a MICROSOFT EXCEL® spreadsheet. Alternatively, each of the views may be generated and displayed through the execution of one or more applications or modules on a general-purpose computer described in more detail below. The general purpose computer may interface with one or more databases to load budget, expense, timesheet, and any other data necessary for generating the variance tracking report. The general purpose computer may also store the generated variance tracking report locally or on the one or more databases. The applications may implement one or more steps necessary for gathering the needed data, sorting the data into hierarchical categories, calculating variances from a baseline over a period of time, and presenting the resulting variance tracking report.

As described above a variance tracking report is provided for informing an enterprise and their customers and investors of the current and projected variances from a planned baseline from an enterprise level down to a project level. This enables targeted action to be taken on specific projects in order to correct for the variances. Also, through the use of carefully selected categories and subcategories the variance tracking report links the operations and planning of the enterprise with the financial implications of the variances. In particular, the placeholder 120 and WIP 124 macro categories correlate the effect that planning in the placeholder stage has on actually implementing the projects. As such, the variance tracking report is not only a forecasting tool to show projections of the direction that the enterprise is heading, but it is also a planning tool to enable the enterprise to be placed back on track in the event of variances.

Spreading Algorithm

The number of personnel needed to staff a project or task development effort may vary from one phase to the next phase. Depending on the duration of phases, the staffing levels may vary from one project to the next. In large projects or in large organizations projecting needed staffing levels can be difficult and challenging. Errors in projecting or estimating needs may result in a sudden, unanticipated drop-off of staffing needs that may result in a layoff of surplus personnel. A method and tool of spreading estimated resource consumption across the different phases of a project based on a defined resource consumption schedule for each phase of the task is described below. It should be appreciated, however, that other systems and methods of spreading and scheduling resource consumption are known to one skilled in the art and the present disclosure should not be limited to the method employed and disclosed below. The consumption schedule employed may be a generic consumption schedule based on averages calculated from actual charged hours and costs from completed projects. Alternatively, a custom consumption schedule may be provided for individual projects to accommodate special characteristics unique to the individual project. By using appropriate consumption schedules to estimate resource consumption in each of the phases of a task greater insight into and understanding of future needs may be obtained, thereby contributing to more reliable achievement of management goals. An insight of the disclosure is that the percentage of project duration expended in different project phases is independent of the percentage of project effort expended in the associated project phases.

Figure 7:
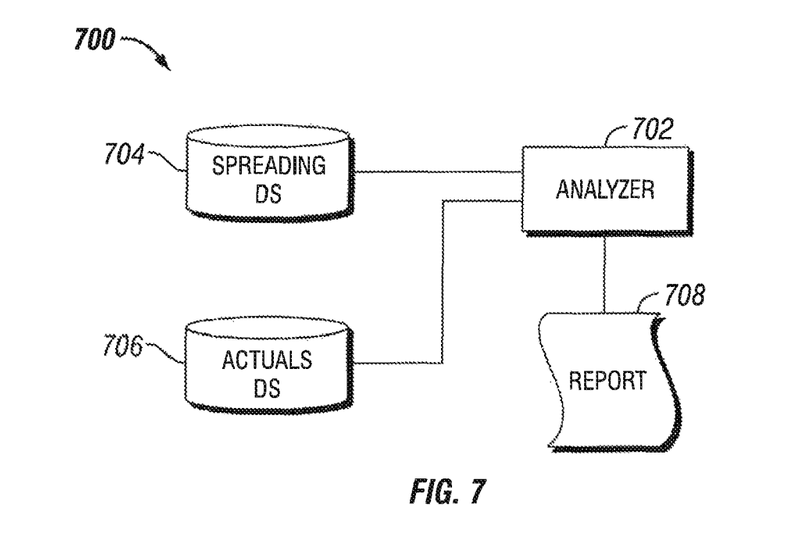
FIG. 7 is a block diagram of a resource spreading system according to an embodiment of the present disclosure.

Turning now to FIG. 7, a block diagram of a system 700 for spreading resource estimates is depicted. The system 700 comprises an analyzer component 702, a spreading data store 704, and an actuals data store 706. The actuals data store 706 stores historical data from completed projects. The analyzer component 702 may be a computer program or application and is suitable to be executed on any general purpose computer system. The spreading data store 704 and the actuals data store 706 may be implemented by using a general purpose computer system. General purpose computer systems are described in greater detail hereinafter.

Figure 8A:
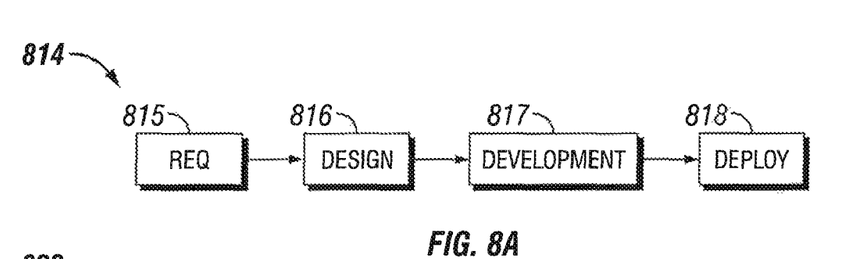
FIGS. 8A, 8B, and 8C depict an exemplary project lifecycle, project schedule, and resource schedule according to an embodiment of the present disclosure.

Turning to FIG. 8A, an exemplary project lifecycle 814 is illustrated. In an embodiment, the project lifecycle 814 may comprise a requirements analysis phase 815, a design phase 816, a development phase 817, and a deployment phase 818. Generally, the main work of the project flows from the requirements analysis phase 815, to the design phase 816, to the development phase 817, and to the deployment phase 818, but some time may be spent in any given phase reworking some of the tasks associated with the previous phases. For example, during the development phase 817, unresolved design and requirements issues may be discovered causing some additional work to be done in both the requirements analysis phase 815 and the design phase 816. The requirements analysis phase 815 is directed to identifying the functional behavior expected and or desired by the project consumer, for example a customer, and identifying appropriate engineering requirements of a system that can provide the desired functional behavior.

The design phase 816 is directed to crafting an architecture or a skeleton of a system that provides the functional behavior. The results of the requirements phase 815 typically provides guidance to the design phase 816 or defines, at a high level, what is to be designed. The design phase 816, for example, may involve identifying a system of cooperating software and/or hardware components, defining the interfaces among these components, defining software tasks, and defining software classes within each software task. The design phase 816 may involve determining a projected processing load of an application and planning how to distribute the processing load across multiple hosts or computers. The design phase 816 may involve identifying a growth path for scaling up the design as the processing load increases over time, for example as corporate accounts increase in number. The design phase 816 typically provides guidance to the development phase 817 or defines what is to be built. The development phase 817 is directed to building a working system in accordance with the design and testing the system in accordance with the requirements. Because the development phase 817 is large, in some embodiments it may be further partitioned into additional phases, for example an implementation phase, a unit test phase, a system integration phase, and a system test phase. The completed system provided by the development phase 817 provides the system that is deployed during the deployment phase 818, for example installing a working system in the facility of a customer. The deployment phase 818 may also include a warranty period during which the enterprise repairs problems in the system reported by users or the customer.

The spreading data store 704 contains project and task information that may be used by the analyzer 702 to determine an estimate or forecast of resource consumption per unit of time. The spreading data store 704 contains a project schedule identifying the duration of each of the phases of the project. The project schedule may include a start date and an end date of the project. The duration of each phase may be defined as a percentage of the project duration.

Figure 8B:
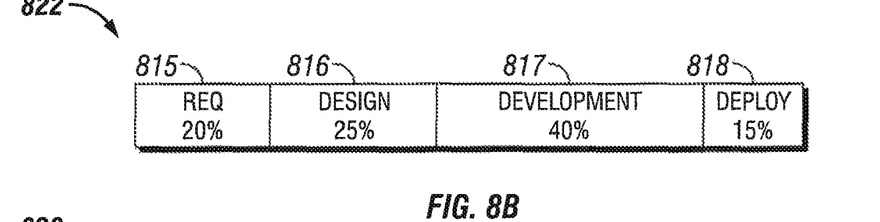

Turning now to FIG. 8B, an exemplary project schedule 822 is illustrated with the percentages of the project duration consumed by each phase. It has been observed that the duration of project phases tend to consume a constant percentage of total project duration or calendar time. This is contrary to expectation in that applying twice as many personnel resources to the task of requirements analysis, for example, may be expected to reduce the duration of the requirements analysis phase by half, but the expected reduction does not occur and in fact the duration may remain substantially unchanged. It may be that fixed time lags associated with interacting with other personnel, for example scheduling meetings, constrain progress.

The percentages may be based on, for example, data from completed projects which is maintained in the spreading data store 704 or actuals data store 706. The requirements analysis phase 815 is depicted as consuming 20% of the duration of the project, the design phase 816 is depicted as consuming 25% of the duration of the project, the development phase 817 is depicted as consuming 40% of the duration of the project, and the deployment phase 818 is depicted as consuming 15% of the duration of the project. In an alternate embodiment, the deployment phase 818 may consume a fixed time duration, for example thirty days. In the fixed time duration deployment phase 818 embodiment, the durations of the remaining project phases are defined as a percentage of project duration exclusive of the deployment phase 818.

The spreading data store 704 also contains a generic task resource consumption schedule identifying the percentage of resources, for example budget hours, that are typically expended during each task phase. It has been observed that the magnitude of effort consumed in each phase of projects, as a percentage of total project effort, tends to be constant and independent from the scale of the project. For example, it may be that approximately twenty percent of project effort is consumed in requirements analysis whether the project is a 10,000 hour project or a 100,000 hour project.

Figure 8C:
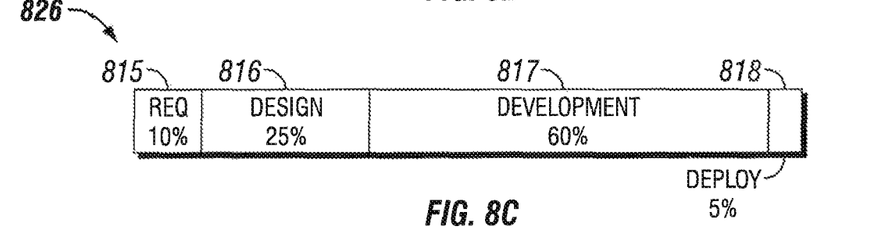

Turning now to FIG. 8C, an exemplary resource schedule 826 is depicted. The requirements analysis phase 815 is depicted as consuming 10% of project resources, the design phase 816 is depicted consuming 25% of project resources, the development phase 817 is depicted consuming 60% of project resources, and the deployment phase 818 is depicted consuming 5% of project resources. The generic task resource consumption schedule is based on a record of resource consumption from previously completed tasks. This information may be generated, for example, by the analyzer component 702 working on information stored in the actuals data store 706.

In a preferred embodiment, the analyzer component 702 selects data of appropriate dates from the actuals data store 706, for example data from the last six months of completed projects. Data contained by the actuals data store 706, for example actual reporting data on hours worked on specific projects, may be stored along with an appropriate indication of the time and date the data was stored, which may be referred to as a time-date stamp of the data. The analyzer component 702 may select from available data in the actuals data store 706 based on the time-date stamp of the data. Older data, for example three year old data, may not be as applicable as more recent data because processes may have changed. It may be that data from special ranges of dates may be deemed extraordinary and/or not typical, for example data from the months of November, December, and/or January when an above average amount of vacation may be consumed by staff. The same generic task consumption schedule may be employed to spread resource estimates for all tasks for a given project.

The spreading data store 704 may contain one or more custom task resource consumption schedules. Some tasks may not conform to the typical resource consumption schedule. For example, an architecture task may consume all of the resources allocated to the task during the requirements analysis and design phases. For example, a project to develop embedded software to execute on a processor adapted to a special environment and employing specialized interfaces may consume more resources in the development phase 817 due to additional system integration activities. Users of the system 700 may define these custom task resource consumption schedules using a spreadsheet program or other data entry mechanism, for example entering an arbitrary percentage for each of the project phases, the sum of the percentages adding up to 100%. The generic task resource consumption schedule, the custom task resource consumption schedules, and the project schedule may be stored as spreadsheets in the spreading data store 704.

The analyzer component 702 generates the resource schedule of resource expenditure per unit of time for one or more tasks. The unit of time, also referred to as periods of duration, may be weeks, months, or some other preferred unit of time. The analyzer component 702 may store the estimated schedules of resource expenditure in the spreading data store 704. The analyzer component 702 may also generate a report 708 including the estimated schedule of resource expenditure for one or more tasks. In an embodiment to generate an estimated schedule or resource expenditure, the analyzer 702 accesses the information stored in the spreading data store 704 and determines the estimated resource consumption per unit time of each phase as:

$$\text{estimate} = \left\{\frac{100}{(P_d)(\varphi_d)}\right\}\left\{\frac{T\varphi_\%}{100}\right\}LOE = \frac{LOE \times T\varphi_\%}{P_d \times \varphi_d} \quad (1)$$

where $P_d$ is the total project duration in an appropriate time unit, $\psi P_d$ is the duration of the subject project phase as a percentage of the total project duration, $T\psi_\%$ is the percentage of task resources scheduled to be consumed during the subject project phase, and LOE is the total of resources allocated for the subject task. For the deploy-warranty phase, if a fixed time duration is assumed, the fixed duration time expressed in the appropriate units replaces the factor $P_d \times \psi_d$. In another embodiment, a different equation may be employed. In another embodiment, the equation may be elaborated to take account of different labor rates of different responsibilities and/or non-constant hour consumption schedules within a project phase.

Several exemplary projects are now discussed. In a first exemplary project, the exemplary project schedule 822 is employed. The first project is scheduled to start on January 1, and complete on December 31, and has an estimated level of effort of 400,000 hours. Based on this information, the requirements analysis phase 815 will consume 10.4 weeks, the design phase 816 will consume 13 weeks, the development phase 817 will consume 20.8 weeks, and the deployment phase 818 will consume 7.8 weeks. Assuming the preferred time unit is the week, these phases may be rounded so that the requirements analysis phase 815 will consume 10 weeks, the design phase 816 will consume 13 weeks, the development phase 817 will consume 21 weeks, and the deployment phase 818 will consume 8 weeks. In the first project, the exemplary resource schedule 826 is employed. Based on this information, the requirements analysis phase 815 will consume 40,000 hours, the design phase 816 will consume 100,000 hours, the development phase 817 will consume 240,000 hours, and the deployment phase 818 will consume 20,000 hours. The requirements analysis phase 815 will consume about 4,000 hours per week from January 1 to about March 12, the design phase 816 will consume about 7,692 hours per week from about March 13 to about June 11, the development phase will consume about 11,429 hours per week from about June 12 to about November 5, and the deployment phase 818 will consume about 2,500 hours per week from about November 6 to December 31.

In a second exemplary project, the exemplary project schedule 822 is employed and the exemplary resource schedule 826 is employed, but the development phase is sub-divided into a coding sub-phase that consumes 70% of both development time and level of effort, a unit testing sub-phase that consumes 10% of both development time and level of effort, and a system testing sub-phase that consumes 20% of both development time and level of effort. Based on this information, the coding sub-phase will consume about 11,200 hours per week from about June 12 to about September 24, the unit test sub-phase will consume about 11,400 hours per week from about September 25 to about October 8, and the system test sub-phase will consume about 11,400 hours per week from about October 9 to about November 5. The dates and weekly hour consumption rate for the other project phases remains unchanged. In the second project, the percentages for duration and resource consumption of the sub-task phases are identical, but in other embodiments different percentages may be employed.

In a third exemplary project, the deployment phase 818 is a fixed 30 day interval. In the third project the project schedule allocates 25% of the schedule to the requirements analysis phase 815, 35% of the schedule to the design phase 816, and 40% of the schedule to the development phase 817 for a total of 100%. The third project is scheduled to start on January 1 and to complete, through the end of the development phase 817, by about November 30. The third project has an estimated level of effort of 400,000 hours and uses the exemplary resource schedule 826. Based on this information, the requirements analysis phase 815 will consume about 40,000 hours over about 12 weeks at a rate of about 3,333 hours per week. The design phase 816 will consume about 100,000 hours over about 17 weeks at a rate of about 5,882 hours per week. The development phase 817 will consume about 240,000 hours over about 19 weeks at a rate of about 12,632 hours per week. The deployment phase 818 will consume about 20,000 hours over 30 days at a rate of about 5,000 hours per week.

A fourth exemplary project is similar to the first exemplary project, except that a custom resource schedule 826 is employed. The custom resource schedule 826 calls for using 60% of hour resources in the requirements analysis phase 815 and 40% of hour resources in the design phase 816. This custom resource schedule 826 may apply, for example, for an architecting project or an architecting portion of a project. The fourth exemplary project is scheduled to start January 1, complete about June 11, and consume about 6,000 hours. Based on this information, the requirements analysis phase 815 will consume about 3,600 hours from January 1 to about March 12 at a rate of about 360 hours per week. The design phase 816 will consume about 2,400 hours from about March 13 to about June 11 at a rate of about 171 hours per week.

Figure 9:
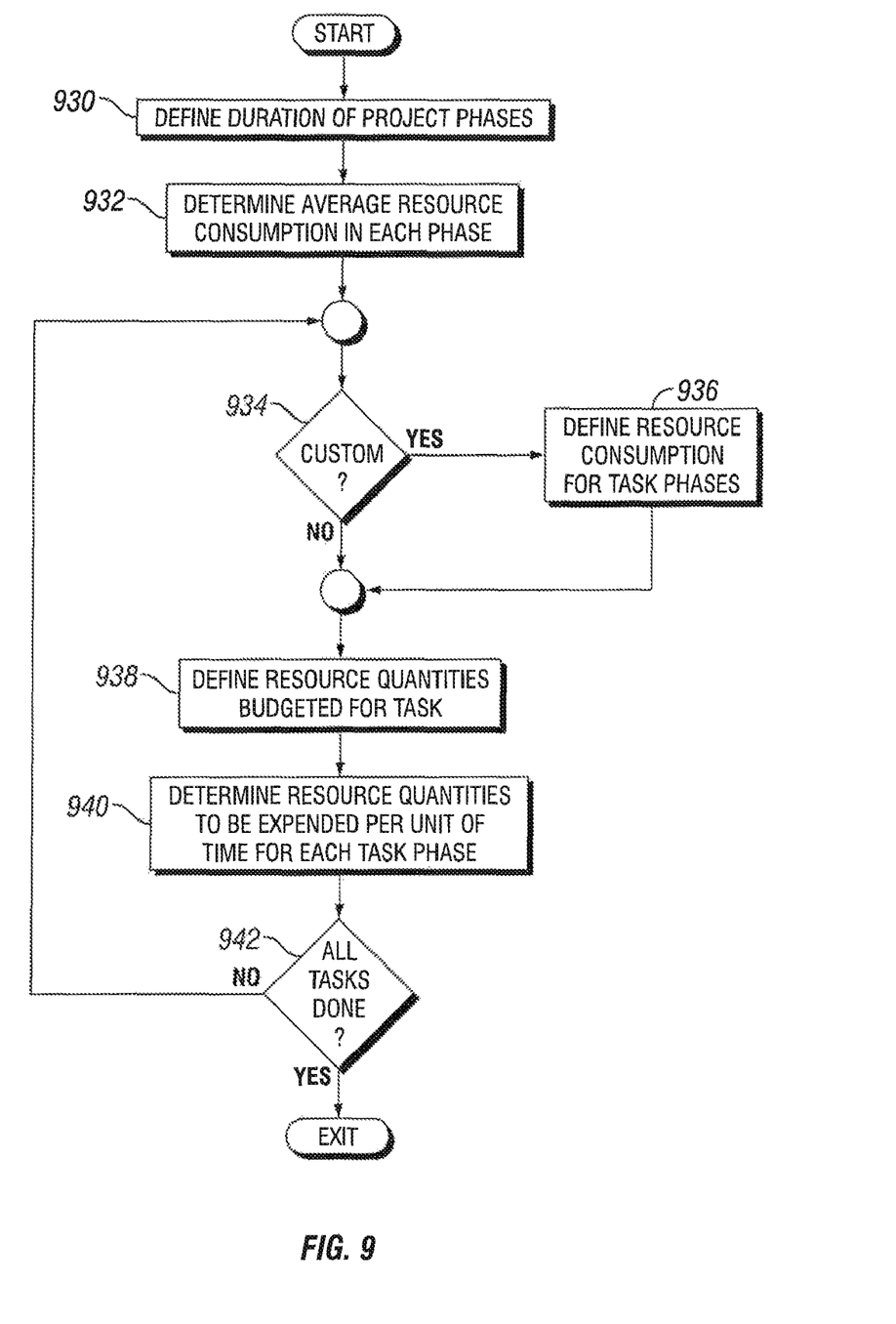
FIG. 9 is a logic flow diagram of a process suitable for practicing spreading algorithm embodiments of the present disclosure.

Turning now to FIG. 9, a process of estimating the resource consumption per unit time for each phase of tasks associated with a project is depicted. In block 930 a duration of the phases of the project are defined. This definition may take the form of a project start date, a project end date, and a definition of what percentage of project duration is consumed in each phase. This information may be stored in a spreadsheet. In an embodiment, the durations of the project phases may be used to determine project schedule milestone dates, for example an end of the requirements analysis phase 815, an end of the design phase 816, an end of the development phase 817, and an end of the deployment phase 818.

The process proceeds to block 932 where the average resource consumption per project phase is determined based on historical data, for example by analyzing the data contained by the actuals data store 706. The results may be expressed as percentages of total project duration in order to make the results more readily applicable to projects having different lengths. This may be referred to as a generic task resource consumption schedule. The actuals used to determine the averages may be selected from a desirable time period to be representative of current processes.

The process proceeds to block 934 where if a custom task resource consumption schedule is desired the process proceeds to block 936 where the custom task resource consumption schedule is defined, as for example by entering data into a spreadsheet. The process proceeds to block 938 where the total amount of resources budgeted for the task, for example a level-of-effort estimate, is defined. The process proceeds to block 940 where the resources to be expended per unit of time for each phase of the subject task are determined and stored. The determination is based on the task resource consumption schedule that applies, either the generic task resource consumption schedule or the custom task resource consumption schedule. The determination is also based on the total amount of resources allocated for the task, and the durations of the project phases. The determination of resources to be expended per unit of time for each phase is stored in the spreading data store 704 for each task.

The process proceeds to block 942 where if more tasks remain to have their resource consumption per unit time determined, the process returns to block 934. When all tasks have had their resource consumption per unit time determined the process exits. In an embodiment, a final report exhibiting the estimated resource expenditure per unit of time for each phase for all the tasks is generated before the process exits. The unit of time, also referred to as periods of duration, may be weeks, months, or some other preferred unit of time. Note that the actual or projected variances to the planned work schedule may be input into the analyzer 702 in order to adjust the determination of the estimated amount of resources consumption per unit of time.

Figure 10:
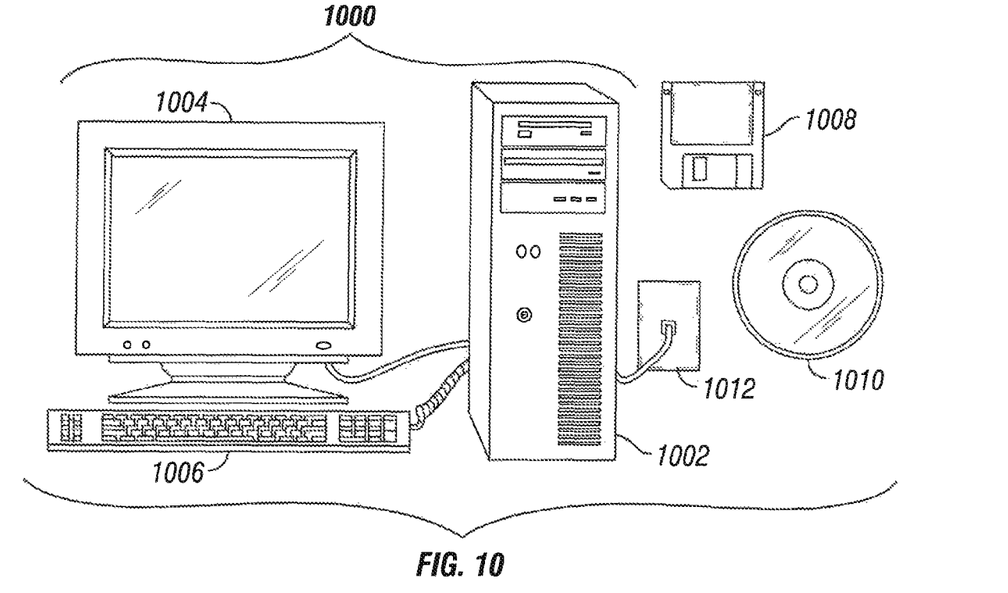
FIG. 10 shows an illustrative system for generating and viewing a variance tracking report embodied as a desktop computer.

FIG. 10 shows an illustrative system 1000 for generating and viewing a variance tracking report. System 1000 is shown as a desktop computer 1000, although any electronic device having some amount of computing power coupled to a user interface may be configured to carry out the methods disclosed herein. Among other things, servers, portable computers, personal digital assistants (PDAs), and mobile phones may be configured to carry out aspects of the disclosed methods.

As shown, illustrative system 1000 comprises a chassis 1002, a display 1004, and an input device 1006. The chassis 1002 comprises a processor, memory, and information storage devices. One or more of the information storage devices may store programs and data on removable storage media such as a floppy disk 1008 or an optical disc 1010. The chassis 1002 may further comprise a network interface that allows the system 1000 to receive information via a wired or wireless network, represented in FIG. 10 by a phone jack 1012. The information storage media and information transport media (i.e. the networks) are collectively called "information carrier media."

The chassis 1002 is coupled to the display 1004 and the input device 1006 to interact with a user. The display 1004 and the input device 1006 may together operate as a user interface. The display 1004 is shown as a video monitor, but may take many alternative forms such as a printer, a speaker, or other means for communicating information to a user. The input device 1006 is shown as a keyboard, but may similarly take many alternative forms such as a button, a mouse, a keypad, a dial, a motion sensor, a camera, a microphone or other means for receiving information from a user. Both the display 1004 and the input device 1006 may be integrated into the chassis 1002.

Figure 11:
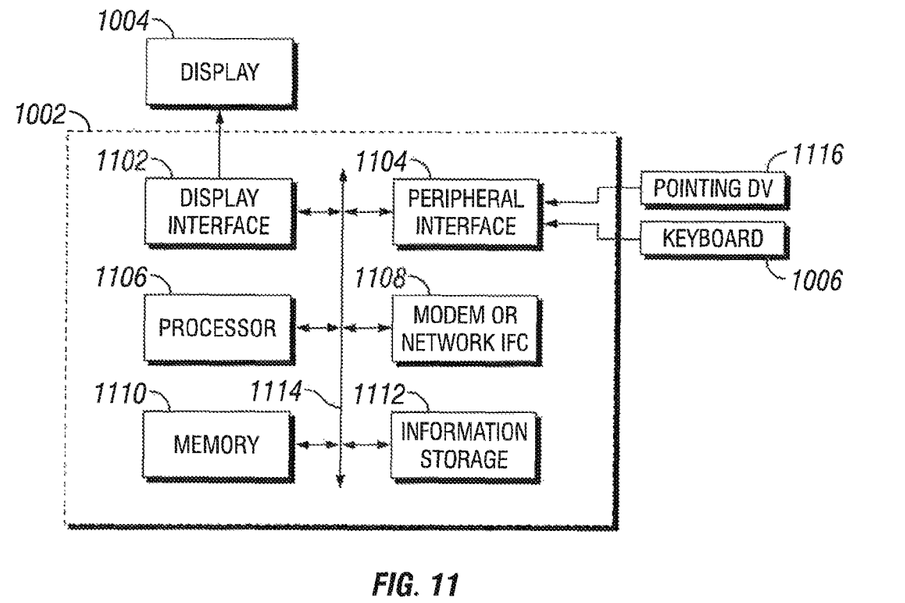
FIG. 11 shows a block diagram of an illustrative variance monitoring system.

FIG. 11 shows a simplified functional block diagram of system 1000. The chassis 1002 may comprise a display interface 1102, a peripheral interface 1104, a processor 1106, a modem or other suitable network interface 1108, a memory 1110, an information storage device 1112, and a bus 1114. System 1000 may be a bus-based computer, with the bus 1114 interconnecting the other elements and carrying communications between them. The display interface 1102 may take the form of a video card or other suitable display interface that accepts information from the bus 1114 and transforms it into a form suitable for the display 1004. Conversely, the peripheral interface 1104 may accept signals from the keyboard 1006 and other input devices such as a pointing device 1116, and transform them into a form suitable for communication on the bus 1114.

The processor 1106 gathers information from other system elements, including input data from the peripheral interface 1104, and program instructions and other data from the memory 1110, the information storage device 1112, or from a remote location via the network interface 1108. The processor 1106 carries out the program instructions and processes the data accordingly. The program instructions may further configure the processor 1106 to send data to other system elements, comprising information for the user which may be communicated via the display interface 1102 and the display 1004.

The network interface 1108 enables the processor 1106 to communicate with remote systems via a network. The memory 1110 may serve as a low-latency temporary store of information for the processor 1106, and the information storage device 1112 may serve as a long term (but higher latency) store of information.

The processor 1106, and hence the computer 1000 as a whole, operates in accordance with one or more programs stored on the information storage device 1112. The processor 1106 may copy portions of the programs into the memory 1110 for faster access, and may switch between programs or carry out additional programs in response to user actuation of the input device. The additional programs may be retrieved from information the storage device 1112 or may be retrieved from remote locations via the network interface 1108. One or more of these programs configure system 1000 to carry out at least one of the variance monitoring methods disclosed herein.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A variance monitoring system that comprises:
memory that stores variance monitoring software; and
a processor coupled to the memory to execute the variance monitoring software,
wherein the variance monitoring software configures the processor to:
gather baseline effort data and revised effort data associated with specific projects, wherein the revised effort data is actual effort data for past times and forecast effort data for future times;
determine for each of the specific projects a variance between the baseline effort data and the revised effort data, wherein the variance is determined at each period for a plurality of periods of time;
categorize the specific projects into a hierarchy having a plurality of levels, at least some of the plurality of levels comprising a placeholder category and a work-in-progress category, wherein the at least some of the plurality of levels comprise an enterprise level and a business unit level, wherein the placeholder category comprises the specific projects that are being modeled and are waiting to be worked on, and wherein the work-in-progress category comprises the specific projects that are currently being worked on; and present a total variance of the specific projects for each period for the plurality of periods of time for each of the placeholder category and the work-in-progress category at one of the enterprise level and the business unit level, wherein the total variance indicates actual variances for past months and forecast variances for future months.

2. The system of claim 1, wherein:

the plurality of periods of time comprise a plurality of months, one or more quarters, and a year.

3. The system of claim 1, wherein:

the categories further comprise subcategories of added projects, unplanned projects, early projects, on-schedule projects, delayed projects, canceled projects, and on hold projects.

4. The system of claim 1, wherein the software further causes the processor to:

display a project level view listing the variances of each project for a selected category at one of the enterprise level and the business unit level a.

5. The system of claim 1, wherein:

the baseline effort, revised effort, variance, and total variance are all measured in man-hours.

6. The system of claim 1, wherein:

the plurality of levels further comprises a project level.

7. The system of claim 1, wherein:

the baseline effort data is determined over each of a plurality of units of time over the course of a project based on a resource budget.

8. The system of claim 7, wherein:

the baseline effort data is further based on a definition of a duration of project phases as a percentage of a total project duration, a project start date, a project end date and an estimate of a percentage of resources to be expended during each project phase.

9. A computer-implemented method comprising:

projecting, by an analyzer component stored on a non-transitory computer readable medium and executed by a processor, for each of a plurality of projects a resource expenditure over each of a plurality of units of time over the course of a project based on a resource budget, the resource expenditure further based on a definition of a duration of project phases as a percentage of a total project duration, a project start date, a project end date and an estimate of a percentage of resources to be expended during each project phase;

determining for each of the plurality of projects a variance between the resource expenditure and an actual or forecast resource expenditure at each period for a plurality of periods of time;

categorizing the plurality of projects into a hierarchy having a plurality of levels, at least some of the plurality of levels comprising a placeholder category and a work-in-progress category, wherein the at least some of the plurality of levels comprise an enterprise level and a business unit level, wherein the placeholder category comprises projects of the plurality of projects that are being modeled and are waiting to be worked on; and wherein the work-in-progress category comprises projects of the plurality of projects that are currently being worked on; and generating, by a computer, a variance tracking report at one of the enterprise level and the business unit level comprising a total variance of the plurality of projects for each period for the plurality of periods of time for each of the placeholder category and the work-in-progress category, wherein the total variance indicates actual variances for past months and forecast variances for future months.

10. The computer-implemented method of claim 9, wherein:

the plurality of levels further comprises a project level.

11. The computer implemented method of claim 10, wherein:

the variance tracking report at the project level comprises a listing of the variances of all of the plurality of projects for a selected category at one of the enterprise level and the business unit level.

12. The computer-implemented method of claim 11, wherein:

the categories comprise categories of placeholder projects and started projects, wherein the categories further comprise subcategories of added projects, unplanned projects, early projects, on-schedule projects, delayed projects, canceled projects, and on hold projects.

13. The computer-implemented method of claim 9, wherein:

the plurality of periods of time comprise a plurality of months, one or more quarters, and a year.

14. The computer-implemented method of claim 9, wherein:

the resource expenditure, actual resource expenditure, forecast resource expenditure, variance, and total variance are measured in man-hours.

15. The computer-implemented method of claim 9, further comprising:

correlating variance values between the placeholder category and the work-in-progress category.

16. The computer-implemented method of claim 15, further comprising:

when the correlating variance values between the placeholder category and the work-in-progress category shows a pattern of variance, initiating a corrective action that includes modifying project planning methodology.

17. The computer-implemented method of claim 9, further comprising:

when categories show variance for one or a few projects, initiating a corrective action that comprises one or more of working more hours, working less hours, increasing productivity, hiring more employees, and adapting management techniques.

* * * * *